United States Patent
Emori

(10) Patent No.: US 11,649,926 B2
(45) Date of Patent: May 16, 2023

(54) PRESSURE VESSEL

(71) Applicant: TOYOTA JIDOSHA KABUSHIKI KAISHA, Toyota (JP)

(72) Inventor: Sakuma Emori, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/511,759

(22) Filed: Oct. 27, 2021

(65) Prior Publication Data

US 2022/0049816 A1 Feb. 17, 2022

Related U.S. Application Data

(62) Division of application No. 16/564,374, filed on Sep. 9, 2019, now Pat. No. 11,215,322.

(30) Foreign Application Priority Data

Sep. 28, 2018 (JP) .............................. JP2018-183429

(51) Int. Cl.
*F17C 1/02* (2006.01)

(52) U.S. Cl.
CPC ........ *F17C 1/02* (2013.01); *F17C 2203/0604* (2013.01); *F17C 2203/067* (2013.01);
(Continued)

(58) Field of Classification Search
CPC ...... F17C 1/02; F17C 1/00; F17C 1/08; F17C 1/04; F17C 1/06; F17C 2203/00;
(Continued)

(56) References Cited

U.S. PATENT DOCUMENTS

| 3,266,660 A | 8/1966 | Ragettli |
| 3,815,773 A | 6/1974 | Duvall et al. |

(Continued)

FOREIGN PATENT DOCUMENTS

| DE | 2512313 A | * 9/1976 | ............... F16J 12/00 |
| DE | 2512313 A1 | 9/1976 | |

(Continued)

OTHER PUBLICATIONS

Official Filing Receipt and Specification as filed for unpublished U.S. Appl. No. 16/296,491, filed Mar. 8, 2019.

(Continued)

*Primary Examiner* — Javier A Pagan
(74) *Attorney, Agent, or Firm* — Dickinson Wright, PLLC

(57) ABSTRACT

A pressure vessel includes: a liner made of a resin and configured to store a pressurized fluid; and a reinforcing layer made of a fiber-reinforced resin provided around an outer peripheral surface of the liner. The liner includes a body portion having a tubular shape and a pair of side-end portions each having a domical shape. One of the side-end portions extends continuously from one of two ends of the body portion, and the other one of the side-end portions extends continuously from the other one of the two ends of the body portion. The liner includes a restriction portion provided at a center of the liner in an axial direction of the body portion. The restriction portion is configured to restrict displacement of the reinforcing layer in the axial direction.

1 Claim, 6 Drawing Sheets

(52) U.S. Cl.
CPC ............. *F17C 2203/0619* (2013.01); *F17C 2203/0665* (2013.01); *F17C 2203/0673* (2013.01); *F17C 2221/012* (2013.01); *F17C 2221/033* (2013.01); *F17C 2221/035* (2013.01); *F17C 2270/0184* (2013.01)

(58) Field of Classification Search
CPC ......... F17C 2203/06; F17C 2203/0602; F17C 2203/0619; F17C 2203/0614; F17C 2203/0612
USPC ........................................ 220/581, 586, 588
See application file for complete search history.

(56) References Cited

U.S. PATENT DOCUMENTS

| | | | |
|---|---|---|---|
| 5,429,845 | A | 7/1995 | Newhouse et al. |
| 7,389,890 | B1 | 6/2008 | Hempsten |
| 7,556,171 | B2 | 7/2009 | Ishimaru |
| 7,810,670 | B2 | 10/2010 | Carter et al. |
| 8,727,174 | B2 | 5/2014 | Otsubo |
| 2004/0182869 | A1 | 9/2004 | Kubo et al. |
| 2009/0266823 | A1 | 10/2009 | Mazabraud et al. |
| 2010/0075200 | A1 | 3/2010 | Hatta |
| 2012/0048862 | A1 | 3/2012 | Otsuka et al. |
| 2012/0138616 | A1 | 6/2012 | Lindner et al. |
| 2013/0087567 | A1 | 4/2013 | Kaneko et al. |
| 2014/0014667 | A1 | 1/2014 | Flammer |
| 2015/0014332 | A1 | 1/2015 | Nishibu |

FOREIGN PATENT DOCUMENTS

| | | | |
|---|---|---|---|
| JP | 09-108832 | A | 4/1997 |
| JP | 09-119598 | A | 5/1997 |
| JP | 10274392 | A * | 10/1998 |
| JP | 10274392 | A | 10/1998 |
| JP | H10338038 | A | 12/1998 |
| JP | 2015017641 | A | 1/2015 |
| JP | 2016044792 | A | 4/2016 |
| KR | 20140055324 | A * | 10/2012 |
| KR | 20140055324 | A | 5/2014 |
| SU | 485276 | A1 * | 6/1972 |
| SU | 485276 | A1 | 9/1975 |

OTHER PUBLICATIONS

Partial English translation of Chinese Office Action issued in CN 201910846188.4 dated Feb. 23, 2021.

* cited by examiner

PRESSURE VESSEL

This application is a division of U.S. patent application Ser. No. 16/564,374, filed Sep. 9, 2019, which claims priority from Japanese Patent Application No. 2018-183429 filed on Sep. 28, 2018, the disclosures of which, including the specification, drawings and abstract, are incorporated herein by reference in their entireties.

INCORPORATION BY REFERENCE

The disclosure of Japanese Patent Application No. 2018-183429 filed on Sep. 28, 2018 including the specification, drawings and abstract is incorporated herein by reference in its entirety.

BACKGROUND

1. Technical Field

The present disclosure relates to a pressure vessel that includes a liner made of a resin and configured to store a pressurized fluid, and a reinforcing layer made of a fiber-reinforced resin provided around an outer peripheral surface of the liner.

2. Description of Related Art

Conventional pressure vessels include a pressure vessel including a liner made of a resin and configured to store a pressurized fluid, such as a pressurized gas, and a reinforcing layer with which the liner is reinforced from outside the liner (refer to, for example, Japanese Unexamined Patent Application Publication No. 2015-017641 (JP 2015-017641 A)). The reinforcing layer is formed by winding a strip-shaped fiber-reinforced resin around an outer peripheral surface of the liner by filament winding (FW).

SUMMARY

However, when the pressure vessel enters a low-temperature and low-pressure state, the liner made of a resin having a higher linear expansion coefficient than that of the reinforcing layer contracts in its radial direction and axial direction, and thus a gap may be formed between the liner and the reinforcing layer. As a result, the liner and the reinforcing layer may be displaced relative to each other in the axial direction of the liner.

The present disclosure provides a pressure vessel having a configuration that reduces relative displacement between a liner and a reinforcing layer in the axial direction of the liner.

An aspect of the present disclosure relates to a pressure vessel including a liner and a reinforcing layer. The liner is made of a resin. The liner is configured to store a pressurized fluid. The reinforcing layer is made of a fiber-reinforced resin. The fiber-reinforced resin is provided around an outer peripheral surface of the liner. The liner includes a body portion having a tubular shape and a pair of side-end portions each having a domical shape. One of the side-end portions extends continuously from one of two ends of the body portion, and the other one of the side-end portions extends continuously from the other one of the two ends of the body portion. The liner includes a restriction portion provided at a center of the liner in an axial direction of the body portion. The restriction portion is configured to restrict displacement of the reinforcing layer in the axial direction.

According to the foregoing aspect, even when the liner is peeled off from the reinforcing layer due to contraction of the liner in the radial direction and the axial direction, the restriction portion provided at the center of the liner enables the reinforcing layer to be kept held by the liner. As a result, it is possible to reduce relative displacement between the reinforcing layer and the liner in the axial direction of the liner.

According to the foregoing aspect, the restriction portion is provided at the center of the liner, and thus the position at which the reinforcing layer is held by the liner is at the center of the liner. Therefore, an axial force with which each of the domical side-end portions of the liner is peeled off from the reinforcing layer when the liner contracts in the axial direction can be made lower than that in a case where a restriction portion is provided at a position offset from the center of the liner (e.g., at a position close to one end of the liner).

In a case where the caps are provided at the respective end portions of the liner, during contraction of the liner in the axial direction, the caps are kept held by the reinforcing layer and thus a contraction force of the liner acts on the caps in the directions in which the caps are detached from the liner. However, according to the foregoing aspect, the restriction portion is provided at the center of the body portion of the liner, and therefore, such a contraction force is reduced, and thus the force acting on the caps due to contraction of the liner is reduced. Note that, the center of the liner in the axial direction of the body portion signifies a portion including the center of a region between both ends of the liner in the axial direction.

As long as the restriction portion is provided at the center of the liner, the restriction portion provided on the outer peripheral surface of the body portion may be in the form of a spot or may be composed of two or more restriction portions that are separated from each other. In the foregoing aspect, the restriction portion may extend along the circumference of the outer peripheral surface of the body portion. With this configuration, the restriction portion provided at the center of the liner enables the reinforcing layer to be stably held by the liner. The expression "the restriction portion extends along the circumference of the outer peripheral surface of the body portion" in the foregoing aspect signifies that an annular (endless) restriction portion is provided on the outer peripheral surface of the body portion of the liner.

In the foregoing aspect, the restriction portion may be a recessed portion provided in the outer peripheral surface of the body portion, and a part of the fiber-reinforced resin may be disposed in the recessed portion. With this configuration, the liner and the reinforcing layer are engaged with each other by a part of the fiber-reinforced resin, which is disposed in the recessed portion, and thus it is possible to reduce displacement of the reinforcing layer with respect to the liner in the axial direction of the liner.

In the foregoing aspect, the restriction portion may be a projection portion provided on the outer peripheral surface of the body portion, and the projection portion may be covered with the fiber-reinforced resin. With this configuration, the liner and the reinforcing layer are engaged with each other by the fiber-reinforced resin with which the projection portion is covered, and thus it is possible to reduce displacement of the reinforcing layer with respect to the liner in the axial direction.

The projection portion, which is an example of the restriction portion, may be formed as a part of the liner, for example, by scraping away a part of the outer peripheral surface of the liner, as long as the projection portion is provided at the center of the liner. In the foregoing aspect, the projection portion may be a fixed portion provided around the outer peripheral surface of the body portion so as to project from the outer peripheral surface of the body portion, and fixed to the outer peripheral surface. With this configuration, it is possible to easily provide a fixed portion having a desired shape and a desired size at the center of the liner without the need to scrape away a part of the liner.

The fixed portion is not particularly limited as long as it acts as the restriction portion that is a projection portion. In the foregoing configuration, the fixed portion may be a bundle of fibers impregnated with a resin, and the resin of the fixed portion may have higher adhesiveness for the outer peripheral surface of the liner than adhesiveness of the resin included in the fiber-reinforced resin. With this configuration, even when the fiber-reinforced resin is peeled off from the outer peripheral surface of the liner during contraction of the liner, it is possible to more reliably prevent the fixed portion from being peeled off from the outer peripheral surface of the liner.

According to the foregoing aspect of the present disclosure, it is possible to reduce relative displacement between the liner and the reinforcing layer in the axial direction of the liner.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, several example embodiments of the present disclosure will be described with reference to FIG. 1 to FIG. 10.

First Embodiment

Configuration of Pressure Vessel 1

Figure 1:
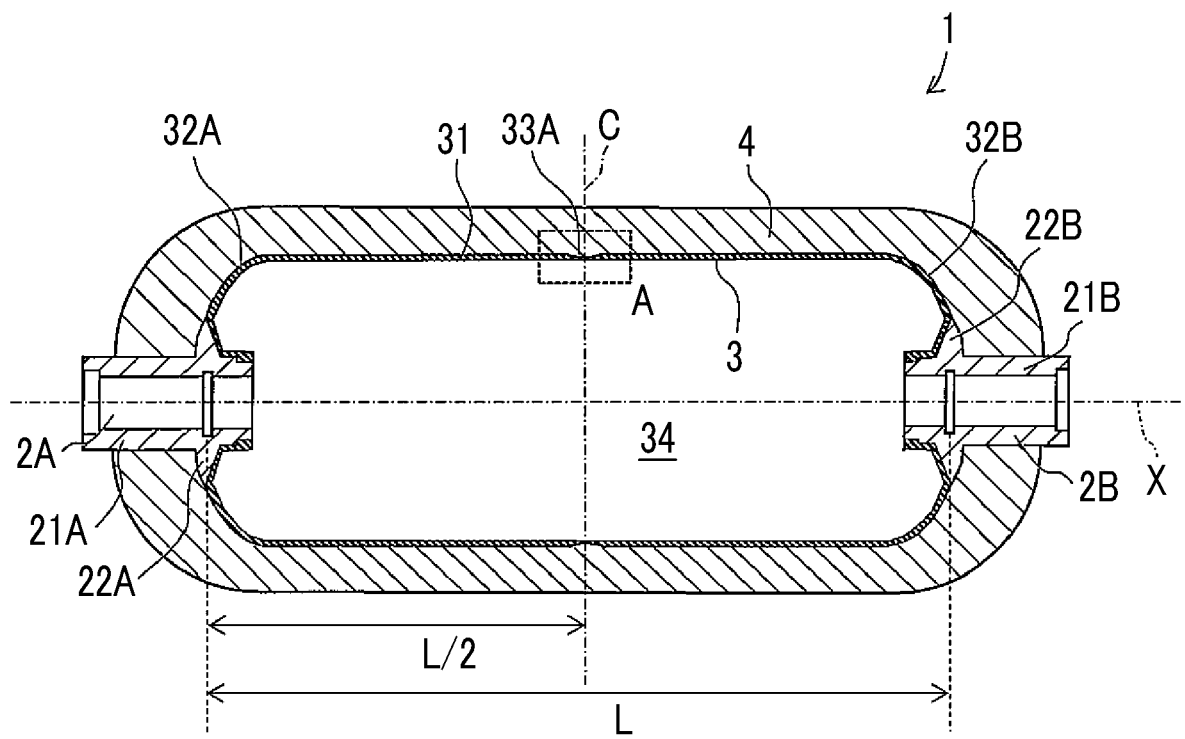
FIG. 1 is a schematic sectional view of a pressure vessel according to a first embodiment of the present disclosure.
Figure 2:
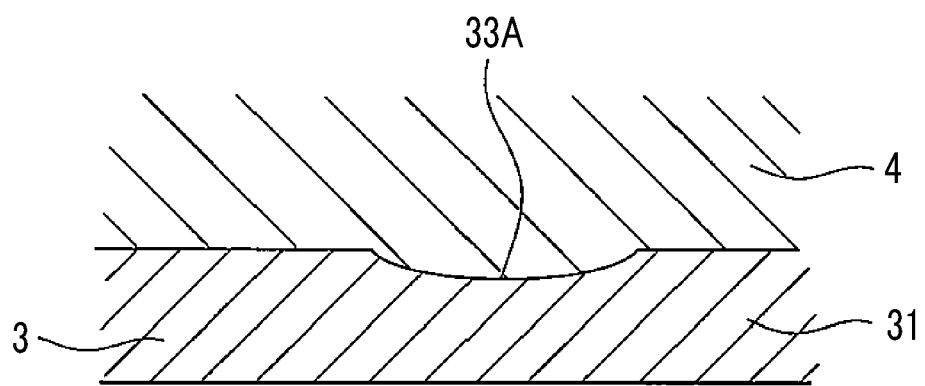
FIG. 2 is an enlarged sectional view of a portion A of the pressure vessel illustrated in FIG. 1.
Figure 3:
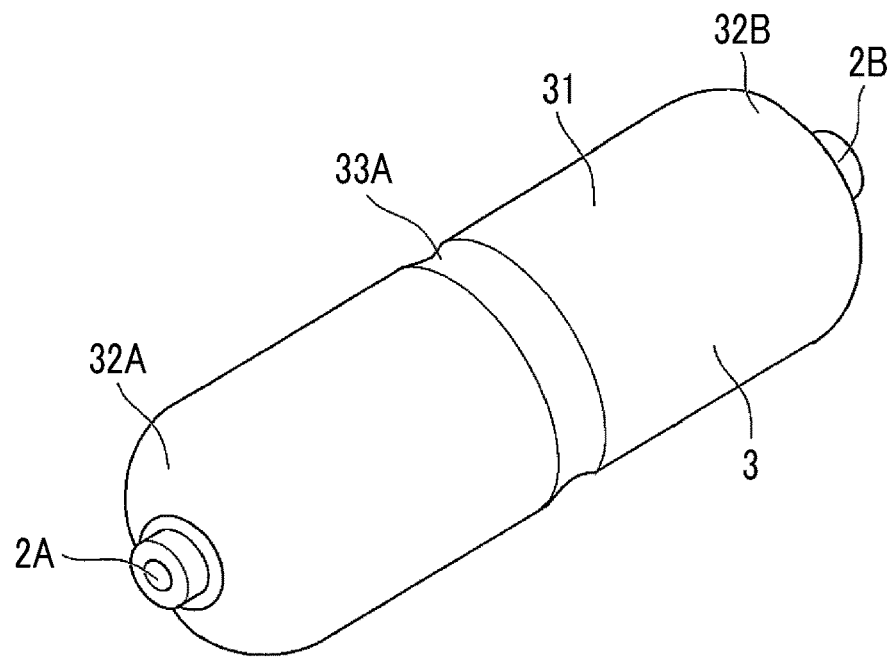
FIG. 3 is a schematic perspective view of a liner of the pressure vessel illustrated in FIG. 1.
Figure 4:
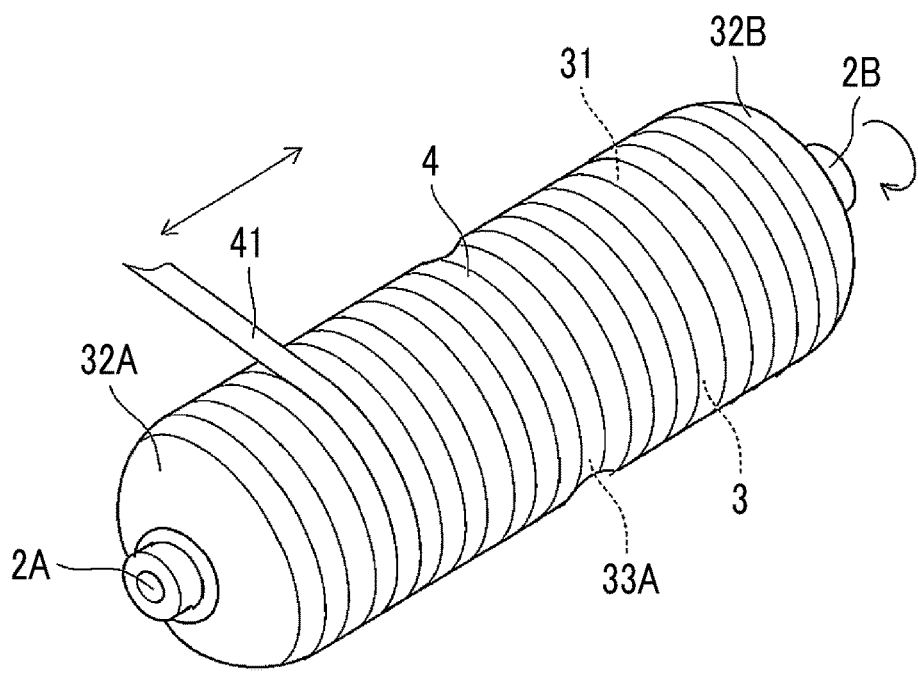
FIG. 4 is a schematic perspective view for describing a method of manufacturing the pressure vessel illustrated in FIG. 1.

FIG. 1 is a schematic sectional view of a pressure vessel 1 according to a first embodiment of the present disclosure. FIG. 2 is an enlarged sectional view of a portion A of the pressure vessel 1 illustrated in FIG. 1. FIG. 3 is a schematic perspective view of a liner 3 of the pressure vessel 1 illustrated in FIG. 1. FIG. 4 is a schematic perspective view for describing a method of manufacturing the pressure vessel 1 illustrated in FIG. 1.

As illustrated in FIG. 1, the pressure vessel 1 is a fuel tank configured to store fuel gas, such as hydrogen gas, to be supplied to a fuel cell in an in-vehicle fuel cell system. The pressure vessel 1 may be used for any purposes other than electricity generation by the fuel cell system. Examples of the substance to be stored in the pressure vessel 1 may include not only hydrogen gas serving as fuel gas, but also various kinds of compressed gas, such as compressed natural gas (CNG), various kinds of liquefied gas, such as liquefied natural gas (LNG) and liquefied petroleum gas (LPG), and various other pressurized substances.

The pressure vessel 1 includes the liner 3, caps 2A, 2B, and a reinforcing layer 4. The liner 3 is made of a resin and configured to store a pressurized fluid. The caps 2A, 2B are made of a metal. The cap 2A is attached to one end portion of the liner 3, and the cap 2B is attached to the other end portion of the liner 3. The reinforcing layer 4 is made of a fiber-reinforced resin. The reinforcing layer 4 is provided such that an outer peripheral surface of the liner 3 is covered with the fiber-reinforced resin and the outer peripheral surface of each of the caps 2A, 2B is partially covered with the fiber-reinforced resin.

The liner 3 has a storage space 34 for storing fuel gas. The storage space 34 is defined by a resin having a gas barrier property against the fuel gas. Examples of the resin material of the liner 3 include thermoplastic resins, such as polyethylene, polypropylene, nylon polyamide, and an ethylene vinyl alcohol copolymer.

The liner 3 includes a body portion 31 having a tubular shape and a pair of side-end portions 32A, 32B each having a domical shape. The side-end portion 32A extends continuously from one end of the body portion 31, and the side-end portion 32B extends continuously from the other end of the body portion 31. The storage space 34 for storing gas is provided inside the liner 3. Specifically, the body portion 31 is a cylindrical portion having a predetermined length and extending along a central axis X of the pressure vessel 1 illustrated in FIG. 1. The side-end portion 32A has such an outer contour that the side-end portion 32A hemispherically bulges out from the one end of the body portion 31. Similarly, the side-end portion 32B has such an outer contour that the side-end portion 32B hemispherically bulges out from the other end of the body portion 31. An opening is provided in a top portion of each of the side-end portions 32A, 32B. The cap 2A made of a metal is fitted in the opening of the side-end portion 32A. Similarly, the cap 2B made of a metal is fitted in the opening of the side-end portion 32B.

The cap 2A is made of a metal, such as aluminum or an aluminum alloy. The cap 2A includes a tubular portion 21A that is a main body, and a flange portion 22A provided on the outer periphery of the tubular portion 21A. The fiber-reinforced resin of the reinforcing layer 4 is wound around the flange portion 22A of the cap 2A and the liner 3, with the flange portion 22A pressed against the outer surface of the side-end portion 32A. A valve (not illustrated) is attached to the cap 2A. With the valve, fuel gas is discharged from the pressure vessel 1 or is allowed to flow into the pressure vessel 1.

Like the cap 2A, the cap 2B is made of a metal, such as aluminum or an aluminum alloy, and includes a tubular portion 21B that is a main body, and a flange portion 22B provided on the outer periphery of the tubular portion 21B. The fiber-reinforced resin of the reinforcing layer 4 is wound around the flange portion 22B of the cap 2B and the liner 3, with the flange portion 22B pressed against the outer surface of the side-end portion 32B. The inside of the tubular portion 21B of the cap 2B is sealed, and thus the storage space 34 is hermetically sealed by the cap 2B.

The reinforcing layer 4 is made of a fiber-reinforced resin (referred also to as "fiber-reinforced plastic (FRP)") including reinforcing fibers (filaments) aligned in one direction and impregnated with a matrix resin. In the present embodiment, the fiber-reinforced resin is wound by hoop winding and helical winding such that multiple layers are formed on the outer peripheral surface of the liner 3 and an exposed portion of the outer peripheral surface of each of the caps 2A, 2B.

Examples of the reinforcing fibers include glass fibers, carbon fibers, aramid fibers, alumina fibers, boron fibers, steel fibers, poly-p-phenylenebenzobisoxazole (PBO) fibers, natural fibers, and high-strength polyethylene fibers. In the present embodiment, a carbon fiber-reinforced resin (referred also to as "carbon fiber-reinforced plastic (CFRP)") including carbon fibers serving as reinforcing fibers is wound around the outer peripheral surface of the liner 3, and a glass fiber-reinforced resin (referred also as "glass fiber-reinforced plastic (GFRP)") including glass fibers serving as reinforcing fibers is further wound around the outer peripheral surface of the liner 3.

In the present embodiment, a thermosetting resin is used as the matrix resin. Examples of the thermosetting resin include an epoxy resin, modified epoxy resins typified by a vinyl ester resin, a phenol resins, a melamine resins, a urea resin, an unsaturated polyester resin, an alkyd resin, a polyurethane resin, and a thermosetting polyimide resin.

In the present embodiment, a thermosetting resin is used as the matrix resin. However, a resin with which a bundle of fibers is impregnated may be a thermoplastic resin as long as the thermoplastic resin can be heated to a softening point (glass transition point) or higher. Examples of the thermoplastic resin include a polyester resin, a polypropylene resin, a nylon resin (e.g., a 6-nylon resin or a 6,6-nylon resin), a polyamide resin, a polycarbonate resin, an acrylic resin, and an Acrylonitrile Butadiene Styrene (ABS) resin.

In the present embodiment, a restriction portion is provided at the center of the liner 3 in a direction along the central axis X (the axial direction) of the body portion 31. The restriction portion has such a shape as to restrict displacement of the reinforcing layer 4 in the axial direction. As illustrated in FIG. 2, an example of the restriction portion is a recessed portion 33A provided in the outer peripheral surface of the body portion 31, and a part of the fiber-reinforced resin of the reinforcing layer 4 is disposed in the recessed portion 33A. In the present embodiment, the fiber-reinforced resin may be disposed in the recessed portion 33A in any manner, as long as the fiber-reinforced resin of the reinforcing layer 4 does not come out of the recessed portion 33A (that is, as long as the fiber-reinforced resin is kept engaged with recessed portion 33A) even when the liner 3 contracts in the radial direction. The maximum depth of the recessed portion 33A is desirably set to such a depth that the fiber-reinforced resin of the reinforcing layer 4 does not come out of the recessed portion 33A of the liner 3 when the liner 3 contracts in the radial direction. It is desirable to set the maximum depth of the recessed portion 33A to a depth greater than the maximum amount by which the liner 3 contracts in the radial direction under a given usage environment of the pressure vessel 1.

In the present embodiment, the recessed portion 33A is an annular groove extending along the circumference of the outer peripheral surface of the body portion 31. The recessed portion 33A is a concave portion recessed with respect to the outer peripheral surface of the liner 3, in a section taken along the axial direction of the liner 3. Specifically, a wall surface that defines the recessed portion 33A (a side wall surface that defines the groove) is a curved wall surface. With this configuration, it is possible to reduce the stress to be concentrated on the recessed portion 33A of the liner 3 when the reinforcing layer 4 is engaged with the recessed portion 33A. The width of the recessed portion 33A (groove width) is not limited to any particular width, and may be, for example, within a range of 5% to 15% of the total length of the liner 3.

The recessed portion 33A can be formed, for example, by scraping away a portion of a conventional liner. However, the recessed portion 33A may be formed in any method. For example, the recessed portion 33A may be formed by deforming a wall portion of the body portion 31 of the liner 3 with the thickness of the liner 3 kept substantially constant.

In the present embodiment, the center of the liner 3 where the recessed portion 33A, which is an example of the restriction portion, is provided signifies a portion including a center line C located at the middle of a region between both ends of the liner 3. The recessed portion 33A may be any portion including the center line C. Therefore, where the length of the liner 3 in its axial direction is denoted by L, the recessed portion 33A is provided so as to include a position that is at a distance of L/2 from each end of the liner 3 in the axial direction.

In the pressure vessel 1 configured as described above, for example, when the fuel gas is discharged from the pressure vessel 1, the fuel gas adiabatically expands in the storage space 34. This may cause a decrease in the internal pressure of the storage space 34, leading to a decrease in the temperature of the fuel gas in the storage space 34. In this case, the liner 3 may contract in its radial direction and axial direction. Even when the liner 3 is peeled off from the reinforcing layer 4 due to contraction of the liner 3, the recessed portion 33A (an example of the restriction portion) provided at the center of the liner 3 enables the reinforcing layer 4 to be kept held by the liner 3. Specifically, the liner 3 and the reinforcing layer 4 are engaged with each other by a part of the fiber-reinforced resin of the reinforcing layer 4, which is disposed in the recessed portion 33A. As a result, it is possible to reduce displacement of the reinforcing layer 4 with respect to the liner 3 in the axial direction.

In particular, because the recessed portion 33A, which is an example of the restriction portion, is provided at the center of the liner 3, the position at which the reinforcing layer 4 is held by the liner 3 is at the center of the liner 3. Therefore, an axial force with which each of the side-end portions 32A, 32B of the liner 3 is peeled off from the reinforcing layer 4 when the liner 3 contracts in the axial direction can be made lower than that in a case where a restriction portion is provided at a position offset from the center of the liner 3 (e.g., at a position close to one end of the liner 3).

In the present embodiment, the caps 2A, 2B are brought into contact with the respective end portions of the liner 3 from outside of the liner 3, as described above. Therefore, when the liner 3 contracts in the axial direction, the caps 2A, 2B around which the fiber-reinforced resin is provided are kept held by the reinforcing layer 4. Thus, a contraction force of the liner 3 acts on the caps 2A, 2B in the directions in which the caps 2A, 2B are detached from the liner 3. However, the recessed portion 33A, which is an example of the restriction portion, is provided at the center of the body portion 31 of the liner 3, and therefore, such a contraction force is reduced, and thus the force acting on the caps 2A, 2B due to contraction of the liner 3 is reduced.

Figure 5A:
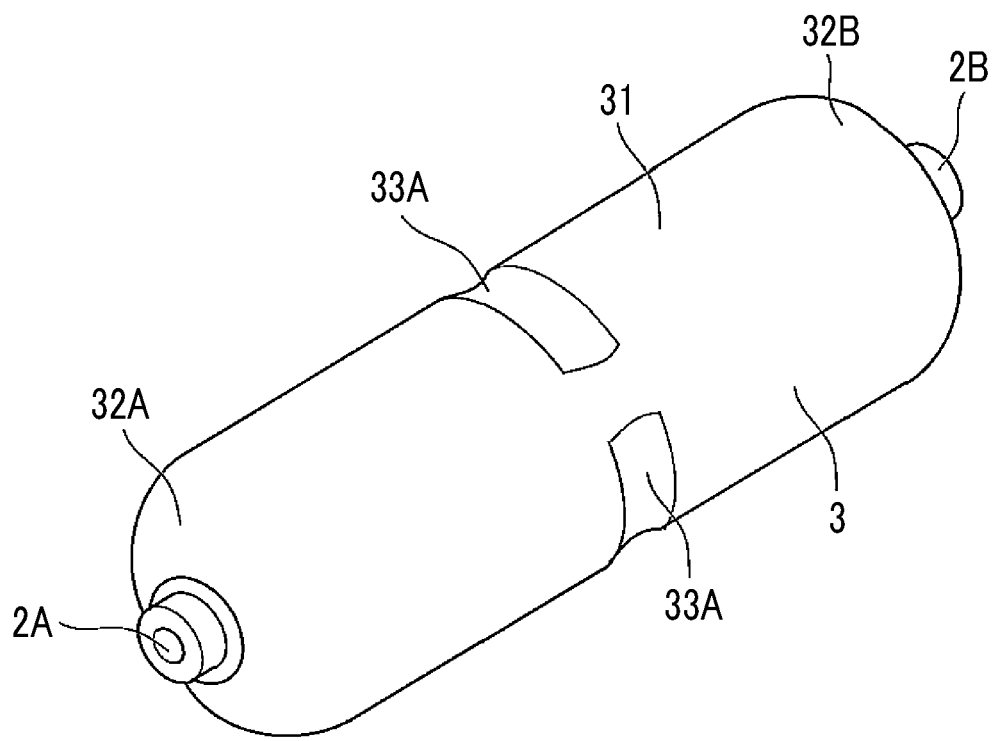
FIG. 5A is a schematic perspective view illustrating a modification example of the liner of the pressure vessel illustrated in FIG. 1.

In particular, because the recessed portion 33A extends along the circumference of the outer peripheral surface of the body portion 31, the recessed portion 33A provided at the center of the liner 3 enables the reinforcing layer 4 to be stably held by the liner 3. As long as a part of the fiber-reinforced resin of the reinforcing layer 4 can be disposed in the recessed portion 33A and the reinforcing layer 4 can be stably held by the liner 3, the recessed portion 33A may be composed of two or more recessed portions that are separated from each other, that are extending in the circumferential direction of the liner 3, and that are disposed at the center of the liner 3, for example, as illustrated in FIG. 5A.

Figure 5B:
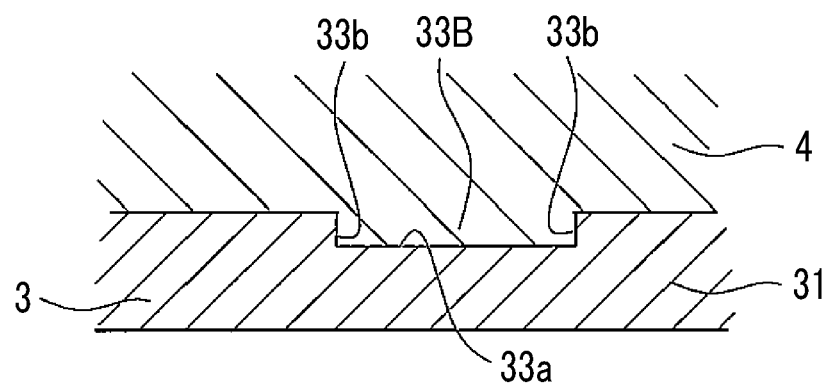
FIG. 5B is an enlarged sectional view of a main portion in a modification example of the pressure vessel illustrated in FIG. 2.

As long as a sufficient strength of the liner 3 is maintained when the reinforcing layer 4 is engaged with the recessed portion 33A, instead of the recessed portion 33A illustrated in FIG. 2, a recessed portion 33B defined by a bottom surface 33a and side wall surfaces 33b rising from the bottom surface 33a may be provided, as illustrated in FIG. 5B.

Method of Manufacturing Pressure Vessel 1

A method of manufacturing the pressure vessel 1 will be described below. First, the liner 3 as illustrated in FIG. 3 is produced. Specifically, a pre-molded tubular member corresponding to the body portion 31 and domical members corresponding to the side-end portions 32A, 32B are joined together. Next, the caps 2A, 2B are fixed to the respective end portions of the liner 3 with, for example, an adhesive. Next, the recessed portion 33A illustrated in FIG. 3 is formed at the center of the liner 3 by scraping away a portion of the body portion 31.

In the present embodiment, the recessed portion 33A is formed at the center of the liner 3 after the caps 2A, 2B are fixed to the respective end portions of the liner 3 with, for example, an adhesive. Alternatively, the recessed portion 33A may be formed in advance in a tubular member corresponding to the body portion 31.

A roughening treatment, such as a blasting treatment or an etching treatment, may be performed on the surface of the recessed portion 33A of the liner 3. The surface roughness of the recessed portion 33A is greater than the surface roughness of the other portion of the outer peripheral surface of the liner 3 than the recessed portion 33A. Thus, the reinforcing layer 4 is easily kept held in the recessed portion 33A due to an anchoring effect.

Next, a fiber-reinforced resin 41 (prepreg) is prepared. The fiber-reinforced resin 41 includes continuous reinforcing fibers aligned in one direction and impregnated with an uncured thermosetting resin. The fiber-reinforced resin 41 that has been prepared is in the form of a strip or a string. The fiber-reinforced resin 41 is wound, in layers, around the outer peripheral surface of the liner 3 to which the caps 2A, 2B have been attached, while a predetermined winding tension is applied to the fiber-reinforced resin 41. By filament winding (FW), the reinforcing layer 4 is formed in the following manner. First, the fiber-reinforced resin 41 is moved in the axial direction while the liner 3 is rotated, so that the fiber-reinforced resin 41 is wound around the outer peripheral surface of the liner 3 by hoop winding while overlaps of the fiber-reinforced resin 41 are created (see, for example, FIG. 4), and then the fiber-reinforced resin 41 is wound around the liner 3 by, for example, helical winding. At this time, the fiber-reinforced resin enters the recessed portion 33A provided in the outer peripheral surface of the liner 3. Then, the reinforcing layer 4 that has been formed is heated to cure the thermosetting resin that has not been cured. In this way, the pressure vessel 1 is obtained.

Second Embodiment

Hereinafter, a pressure vessel according to a second embodiment of the present disclosure and a method of manufacturing the pressure vessel will be described with reference to FIG. 6 to FIG. 8B. A pressure vessel 1 according to the second embodiment is different from the pressure vessel 1 according to the first embodiment, in the shape of a restriction portion provided on the liner 3. Therefore, the same portions as those in the first embodiment will be denoted by the same reference numerals, and detailed description thereof will be omitted.

Figure 6:
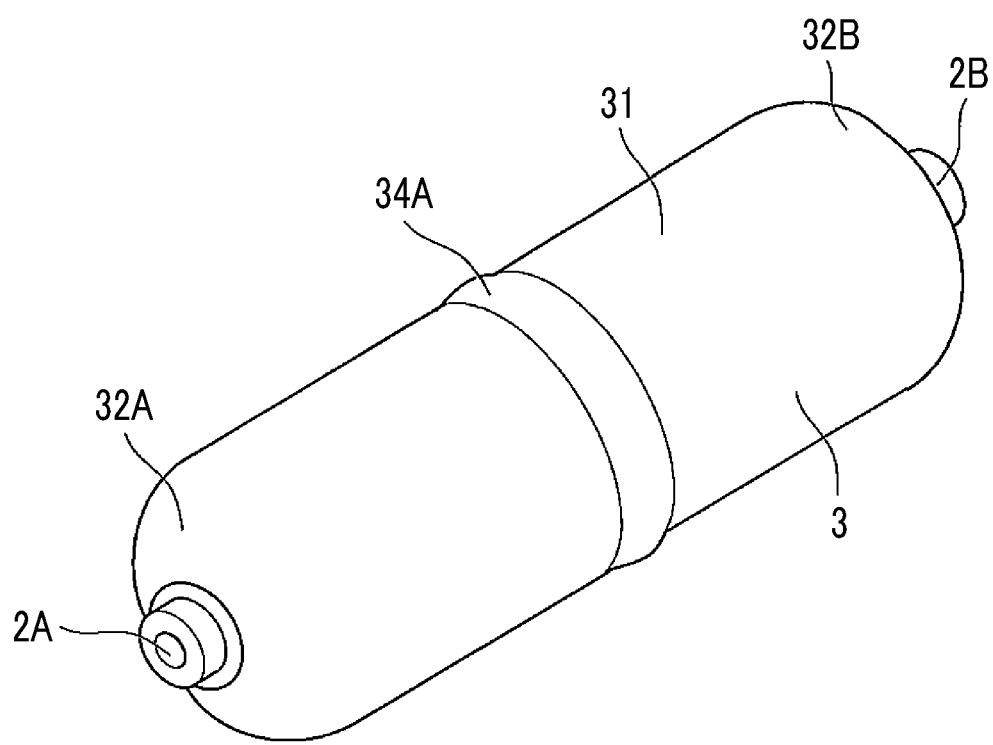
FIG. 6 is a schematic perspective view of a liner of a pressure vessel according to a second embodiment of the present disclosure.
Figure 7:
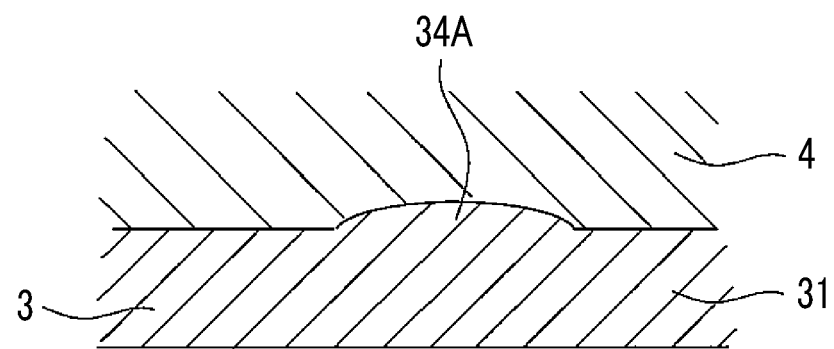
FIG. 7 is an enlarged sectional view of a main portion of the pressure vessel including the liner illustrated in FIG. 6.

As illustrated in FIG. 6 and FIG. 7, in the present embodiment, a restriction portion is provided at the center of the liner 3 in the axial direction of the body portion 31. The restriction portion has such a shape as to restrict displacement of the reinforcing layer 4 in the axial direction. As illustrated in FIG. 6, an example of the restriction portion is a projection portion 34A provided on the outer peripheral surface of the body portion 31, and the projection portion 34A is covered with the fiber-reinforced resin of the reinforcing layer 4. In the present embodiment, the center of the liner 3 where the projection portion 34A, which is an example of the restriction portion, is provided signifies a portion including a center line located at the middle of a region between both ends of the liner 3, as in the first embodiment. The projection portion 34A may be any portion including the center line. It is desirable to set the maximum height of the projection portion 34A to a height greater than the maximum amount by which the liner 3 contracts in the radial direction.

In the present embodiment, the projection portion 34A is an annular ridge extending along the circumference of the outer peripheral surface of the body portion 31. The width of the projection portion 34A (ridge width) is not limited to any particular width, and may be, for example, within a range of 5% to 15% of the total length of the liner 3. The projection portion 34A is a convex portion that bulges with respect to the outer peripheral surface of the liner 3, in a section taken along the axial direction of the liner 3. Specifically, a wall surface that defines the projection portion 34A is a curved wall surface. With this configuration, it is possible to reduce the stress to be concentrated on the projection portion 34A of the liner 3 when the reinforcing layer 4 is engaged with the projection portion 34A.

According to the present embodiment, even when the liner 3 is peeled off from the reinforcing layer 4 due to contraction of the liner 3, the projection portion 34A provided at the center of the liner 3 enables the reinforcing layer 4 to be kept held by the liner 3, as in the first embodiment.

Specifically, the liner 3 and the reinforcing layer 4 are engaged with each other by the fiber-reinforced resin of the reinforcing layer 4 with which the recessed portion 33A is covered. As a result, it is possible to reduce displacement of the reinforcing layer 4 with respect to the liner 3 in the axial direction. Further, it is possible to reduce an axial force that acts when each of the side-end portions 32A, 32B of the liner 3 is peeled off from the reinforcing layer 4 during contraction of the liner 3 in the axial direction. Further, it is possible to reduce forces acting on the caps 2A, 2B due to contraction of the liner 3.

Figure 8A:
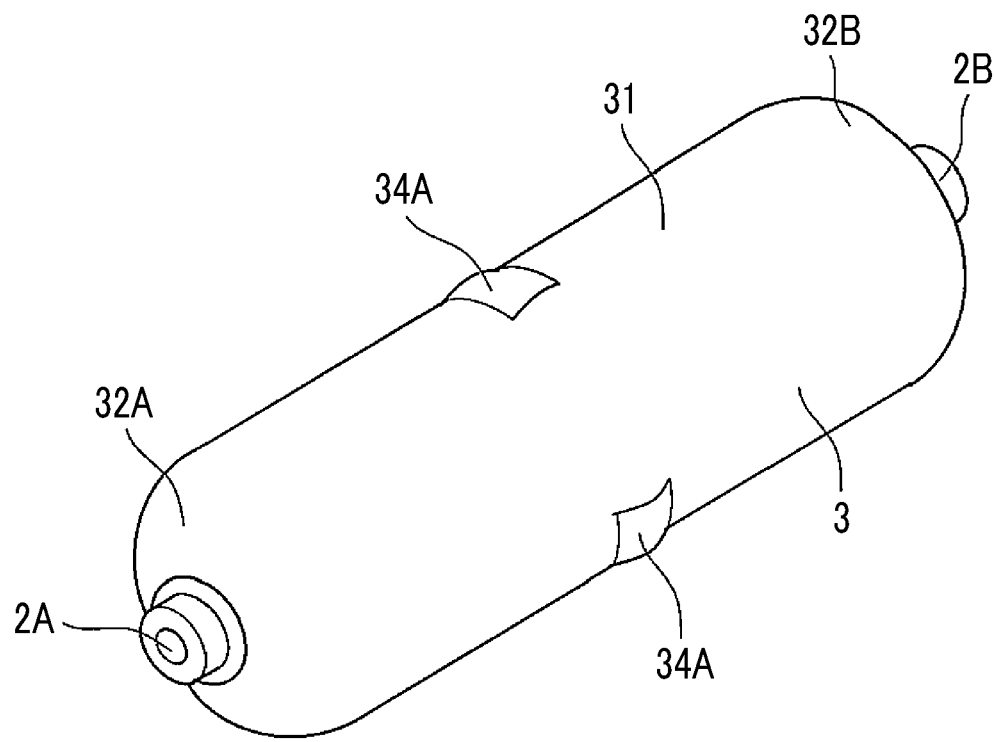
FIG. 8A is a schematic perspective view illustrating a modification example of the liner of the pressure vessel illustrated in FIG. 6.

In particular, because the projection portion 34A extends along the circumference of the outer peripheral surface of the body portion 31, the projection portion 34A provided at the center of the liner 3 enables the reinforcing layer 4 to be stably held by the liner 3. As long as the projection portion 34A is covered with the fiber-reinforced resin of the reinforcing layer 4 and thus the reinforcing layer 4 can be stably held by the liner 3, the projection portion 34A may be composed of two or more projection portions that are separated from each other, that are extending in the circumferential direction of the liner 3, and that are disposed at the center of the liner 3, for example, as illustrated in FIG. 8A.

Figure 8B:
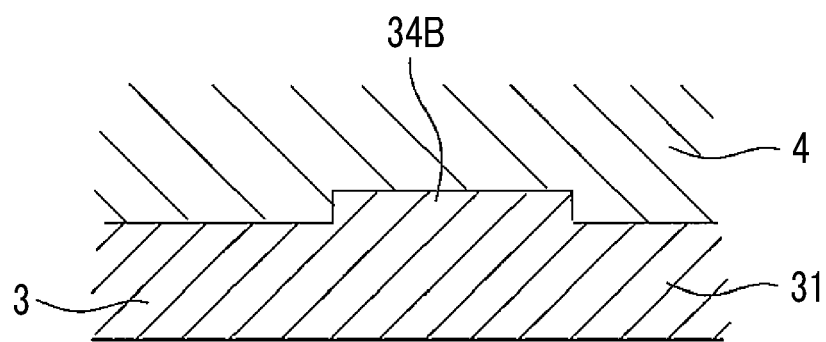
FIG. 8B is an enlarged sectional view of a main portion in a modification example of the pressure vessel illustrated in FIG. 6.

As long as a sufficient strength of the reinforcing layer 4 is maintained when the reinforcing layer 4 is engaged with the projection portion 34A, instead of the projection portion 34A illustrated in FIG. 7, a projection portion 34B having a rectangular section may be provided, as illustrated in FIG. 8B.

During manufacturing of the pressure vessel 1, the projection portion 34A may be formed, for example, by scraping away a portion of a conventional liner before the formation of the reinforcing layer 4. Alternatively, for example, two tubular members having shapes obtained by splitting the shape of the body portion 31 at the center of the body portion 31 are prepared. Then, when end surfaces of the two tubular members are brought into contact with each other and joined together by thermal fusion bonding, portions of the two tubular members, which include the end surfaces, are deformed into the projection portion 34A. The projection portion 34A may be formed during molding of a tubular member corresponding to the body portion 31. After the liner 3 illustrated in FIG. 6 is prepared, the reinforcing layer 4 is formed by winding the fiber-reinforced resin 41 around the outer peripheral surface of the liner 3 including the projection portion 34A, in the same method as the method described with reference to FIG. 4. As a result, the pressure vessel can be obtained. In this way, the surface of the projection portion 34A is covered with the fiber-reinforced resin of the reinforcing layer 4.

Figure 9:
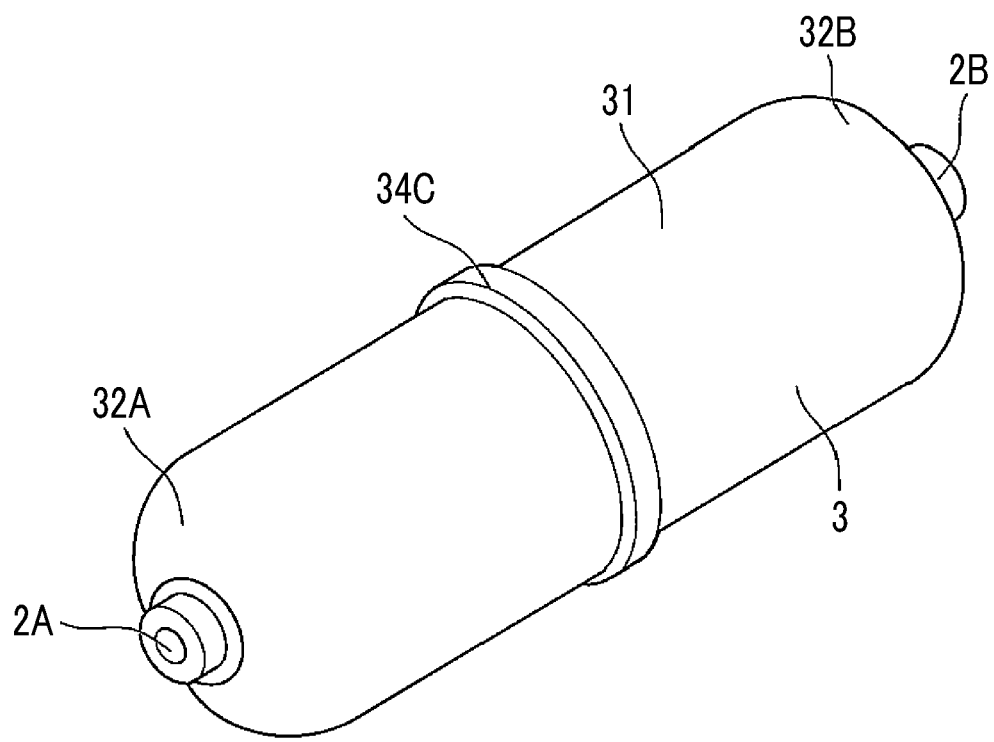
FIG. 9 is a schematic perspective view illustrating another modification example of the liner of the pressure vessel illustrated in FIG. 6.

In FIG. 6 to FIG. 8B, the projection portion 34A, 34B is formed so as to be integral with the liner 3. Alternatively, for example, as illustrated in FIG. 9, the projection portion provided on the liner 3 may be a fixed portion 34C that is provided around the outer peripheral surface of the body portion 31 so as to project from the outer peripheral surface of the body portion 31 and fixed to the outer peripheral surface of the body portion 31. The fixed portion 34C may be made of, for example, a resin such as a thermosetting resin, or metal as long as the fixed portion 34C functions as a restriction portion. In the present embodiment, the fixed portion 34C is a bundle of fibers impregnated with a resin.

A resin with which a bundle of fibers is impregnated is desirably a resin having higher adhesiveness (higher affinity) for the outer peripheral surface of the liner 3 than the matrix resin included in the fiber-reinforced resin of the reinforcing layer 4. For example, when the liner 3 is made of a nylon resin (nylon 6, nylon 66, or the like) and the matrix resin is an epoxy resin, an acrylic modified silicone resin or the like may be an example of the resin with which a bundle of fibers of the fixed portion 34C is impregnated. When the liner is made of a polyethylene resin and the matrix resin is an epoxy resin, cyanoacrylate or the like may be an example of the resin with which a bundle of fibers of the fixed portion 34C is impregnated.

Figure 10:
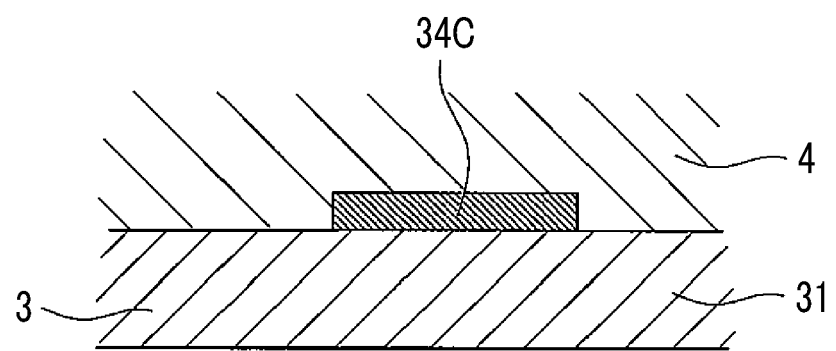
FIG. 10 is an enlarged sectional view of a main portion of the pressure vessel including the liner illustrated in FIG. 9.

The fixed portion 34C can be obtained by winding, multiple times, a bundle of fibers impregnated with an uncured resin around the outer peripheral surface of the body portion 31 at the center of the liner having a smooth outer peripheral surface, and then thermally curing the resin. Then, in the same method as the method described with reference to FIG. 4, the fiber-reinforced resin 41 is wound around the outer peripheral surface of the liner 3 including the fixed portion 34C to form the reinforcing layer 4. As a result, the pressure vessel 1 is obtained. In this way, as illustrated in FIG. 10, the surface of the fixed portion 34C is covered with the fiber-reinforced resin of the reinforcing layer 4.

The resin included in the fixed portion 34C is a resin having higher adhesiveness for the outer peripheral surface of the liner 3 than the resin included in the fiber-reinforced resin of the reinforcing layer 4. Thus, even when the fiber-reinforced resin is peeled off from the outer peripheral surface of the liner 3 during contraction of the liner 3, it is possible to more reliably prevent the fixed portion 34C from being peeled off from the outer peripheral surface of the liner 3.

Before the fiber-reinforced resin is wound around the outer peripheral surface of the liner 3, a roughening treatment may be performed on the surface of the projection portion 34A, the outer surface of the projection portion 34B or the outer surface of the fixed portion 34C. In this way, the surface roughness of the projection portion 34A, the projection portion 34B or the fixed portion 34C that has been subjected to the roughening treatment is greater than the surface roughness of the remaining portion of the outer peripheral surface of the liner 3. Thus, due to an anchoring effect, the reinforcing layer 4 is easily kept held by the projection portion 34A, the projection portion 34B or the fixed portion 34C that has been subjected to the roughening treatment.

Some embodiments of the present disclosure have been described in detail above. However, an applicable embodiment of the present disclosure is not limited to the foregoing embodiments, and various design changes may be made to the foregoing embodiments within the scope of the appended claims.

For example, the fixed portion according to the second embodiment is made of a bundle of fibers impregnated with a resin. Alternatively, the fixed portion may be made of a resin having a higher linear expansion coefficient than that of the resin material of the liner. In this way, the contraction amount of the fixed portion is greater than the contraction amount of the resin material of the liner, and therefore, the fixed portion is more reliably fixed to the outer peripheral surface of the liner.

What is claimed is:
1. A pressure vessel comprising:
   a liner made of a resin, the liner being configured to store a pressurized fluid; and
   a reinforcing layer made of a fiber-reinforced resin, the fiber-reinforced resin being provided around an outer peripheral surface of the liner, wherein the liner includes a body portion having a tubular shape and a pair of side-end portion seach having a domical shape, one of the side-end portions extending continuously from one of two ends of the body portion, and the other one of the side-end portions extending continuously from the other one of the two ends of the body portion, and the liner includes a restriction portion provided at a center of the liner in an axial direction of the body portion, the restriction portion being configured to restrict displacement of the reinforcing layer in the axial direction;

the restriction portion is a projection portion provided on an outer peripheral surface of the body portion; and the projection portion is covered with the fiber-reinforced resin;

wherein the projection portion is a fixed portion provided around the outer peripheral surface of the body portion, the fixed portion projecting from the outer peripheral surface of the body portion, and the fixed portion being fixed to the outer peripheral surface; and wherein the fixed portion is a bundle of fibers impregnated with a resin; and the resin of the fixed portion has higher adhesiveness for the outer peripheral surface of the liner than adhesiveness of the resin included in the fiber-reinforced resin.

* * * * *